L. WOLF.
CONNECTION FOR PRESSURE TANKS.
APPLICATION FILED MAR. 30, 1909.
1,026,066.
Patented May 14, 1912.
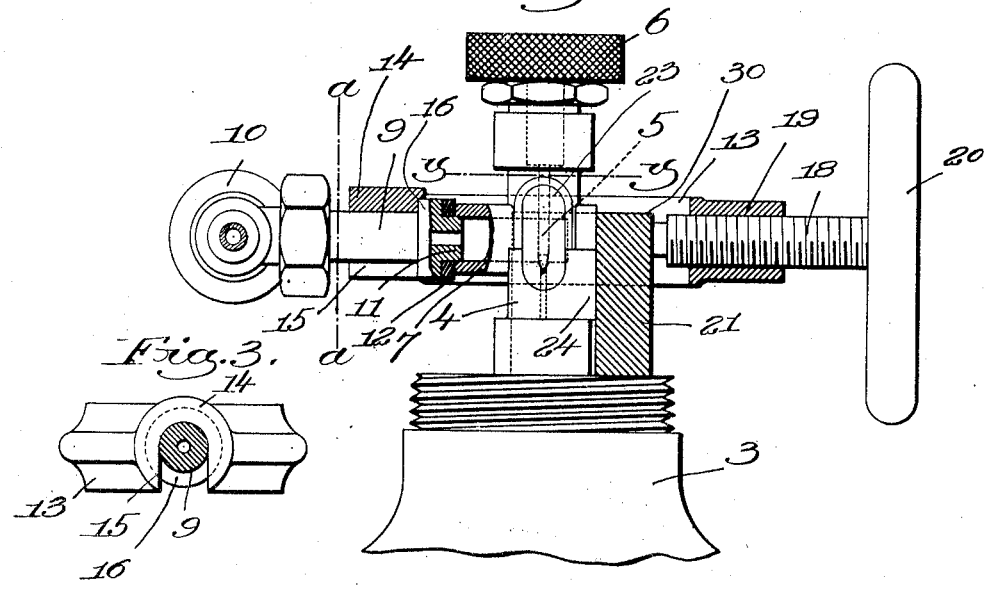
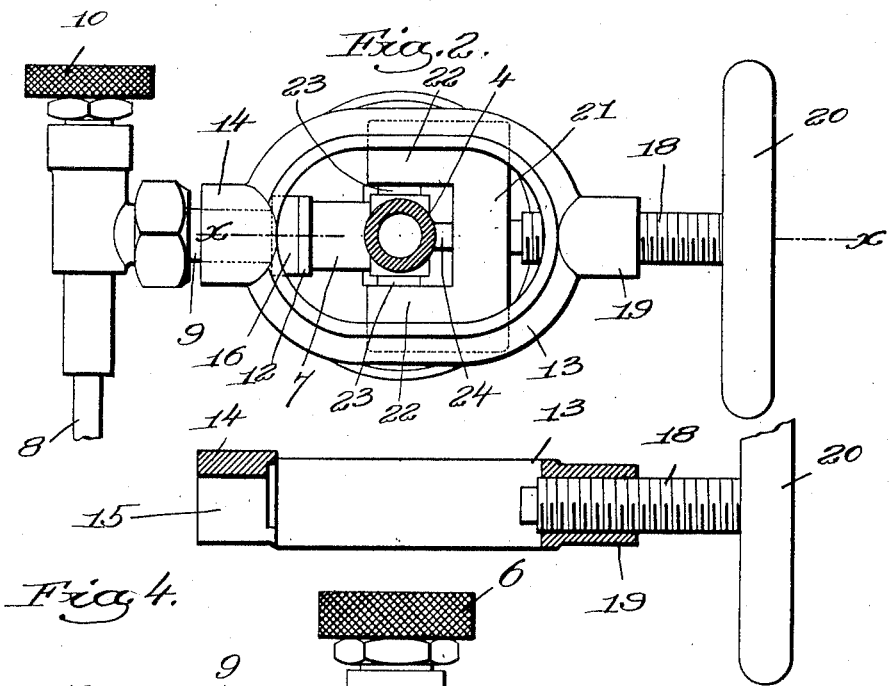
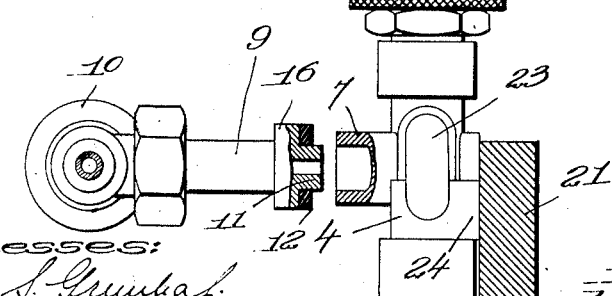

UNITED STATES PATENT OFFICE.

LINUS WOLF, OF BOSTON, MASSACHUSETTS.

CONNECTION FOR PRESSURE-TANKS.

1,026,066.  Specification of Letters Patent.  Patented May 14, 1912.

Application filed March 30, 1909. Serial No. 486,739.

*To all whom it may concern:*

Be it known that I, LINUS WOLF, a subject of the Emperor of Germany, residing at Boston, county of Suffolk, and State of Massachusetts, have invented an Improvement in Connections for Pressure-Tanks, of which the following description, in connection with the accompanying drawing, is a specification, like numerals on the drawing representing like parts.

This invention has for its object to provide a novel detachable connection or coupling for connecting a pipe or other connection to the nozzle of a tank adapted to contain gases or liquids under exceedingly high pressure.

The object of the invention is to provide a novel coupling by means of which the valve or other connection can be quickly coupled to or uncoupled from the nozzle, and which will unite the valve or other connection to the nozzle with a tight joint capable of sustaining a very high pressure without leakage.

In the drawings wherein I have shown one embodiment of my invention, Figure 1 is a section on the line x—x, Fig. 2; Fig. 2 is a section on the line y—y, Fig. 1; Fig. 3 is a section on the line a—a, Fig. 1; Fig. 4 is a view showing the coupling member detached.

In the accompanying drawings, 3 designates a portion of a tank or container of any suitable or usual construction which is adapted to contain gases or liquids under high pressure. This container is shown as having a neck 4 extending therefrom which is provided with a needle valve 5 of any suitable or usual construction capable of being operated by the thumb-piece 6 in usual manner, and which is also provided with the nipple 7 to which the valve or other connection is adapted to be coupled. In the present embodiment of my invention this nipple extends transversely to the length of the neck. The connection which I have shown herein to be coupled to the nipple 7 is in the form of a valved connection which is provided with a delivery pipe 8. This valved connection is provided with the hollow stem 9 and with a valve 10 that controls the communication between the stem 9 and the delivery pipe 8. The end of the stem 9 is reduced in diameter as at 11, and is of a size to fit the interior of the nipple 7, as clearly shown in Fig. 1. Said reduced end carries a gasket or packing ring 12 that is adapted to engage the end of the nipple and pack the joint between the stem and the nipple. For coupling this connection 9 to the nipple 7 I employ the coupling member 13 which is herein shown in the form of a yoke adapted to set over the neck 4 and adapted to engage the stem 9 and hold it firmly in place against the end of the nipple 7. This yoke 13 is made with the boss 14 that is cut out on one side, as at 15, to receive the stem 9. The stem 9 is provided with the enlarged portion or head 16 against which the boss 14 has engagement so that by moving the yoke 13 to the right Figs. 1 and 2, the stem 9 will be drawn hard against the end of the nipple. The yoke 13 is also provided with a clamping screw 18 which has screw-threaded connection with the boss 19, and which is provided with a handle 20 by which it may be manipulated. This clamping screw 18 may directly engage the stem 4 or I may employ an intermediate piece 21 which operates as an abutment against which the screw 18 has engagement. This intermediate piece 21 when used is separate from the tank 3 and merely rests on the top thereof. I prefer to make said intermediate piece U-shape, as shown in Fig. 2, so that the two wings 22 thereof embrace the sides of the neck 4.

If desired either the neck 4 or the intermediate member 21 may be made with the projections 24 so that the U-shaped member will fit the neck. When the intermediate member 21 is used the turning up of the screw 18 will operate to draw the connection 9 hard against the end of the nipple 7, as will be obvious. The upper portion 30 of the intermediate member 21 is of a shape to be received within the yoke so that it operates to hold the yoke in proper position. It is possible to use the yoke without the presence of the intermediate member, in which case the end of the screw 18 would directly engage the side of the neck 4 or would engage the projection 24 carried thereby.

When the parts are to be coupled together, the connection 9 is placed in position relative to the nipple 7 and then the yoke 13 is dropped down over the neck 4 so that the connection 9 will enter the slot 15. If the abutment or intermediate member 21 is to be used, this will be placed in position before the yoke is put in place. It will thus be seen that my coupling is one which can be readily applied and when it is in use the handle 20 by which the clamping screw is set up is in such a position that it can be readily operated. The character of the connection which is coupled to the nipple 7 is not essential to my invention, although for many purposes a valved connection is a desirable one to use.

I have shown one embodiment only of my invention and do not wish to be limited to the constructional details illustrated.

Having fully described my invention, what I claim as new and desire to secure by Letters Patent is:—

1. The combination with the neck of a tank or container having a nipple extending laterally therefrom and a headed connection separable from the nipple, of a yoke-shaped coupling member separable and detachable from both the neck and the connection and embracing said neck and provided with a slotted boss embracing the connection and engaging the head thereof, a positioning abutment member separate from the coupling member and embracing and positioned by the neck and received between the sides of and positioning the coupling member, and a clamping screw engaging said abutment and clamping the connection to the nipple.

2. The combination with a neck of a tank or container having positioning lugs extending therefrom and a nipple also extending laterally therefrom, of a connection having a headed projection to be coupled to the nipple, a yoke-shaped coupling member separable and detachable from both the neck and connection and embracing said neck and provided with a slotted boss embracing the connection and engaging the head thereof, a positioning abutment member separate from the coupling member and embracing the neck and engaging the positioning lugs thereof, said member being received between the sides of and positioning the coupling member, and a clamping screw engaging said abutment and clamping the projection to the nipple.

In testimony whereof, I have signed my name to this specification, in the presence of two subscribing witnesses.

LINUS WOLF.

Witnesses:
 Louis C. Smith,
 Thomas J. Drummond.